United States Patent
Tang et al.

(10) Patent No.: US 10,387,685 B2
(45) Date of Patent: Aug. 20, 2019

(54) METHOD AND DEVICE FOR INVOKING JAVA CARD OBJECT

(71) Applicant: CHINA UNITED NETWORK COMMUNICATIONS GROUP COMPANY LIMITED, Beijing (CN)

(72) Inventors: Yafei Tang, Beijing (CN); Yunyong Zhang, Beijing (CN); Zhijun Wang, Beijing (CN); Ni Zhang, Beijing (CN); Di Liu, Beijing (CN); Xiaodi Wang, Beijing (CN)

(73) Assignee: CHINA UNITED NETWORK COMMUNICATIONS GROUP COMPANY LIMITED, Beijing (CN)

( * ) Notice: Subject to any disclaimer, the term of this patent is extended or adjusted under 35 U.S.C. 154(b) by 315 days.

(21) Appl. No.: 15/230,291

(22) Filed: Aug. 5, 2016

(65) Prior Publication Data
US 2017/0039395 A1 Feb. 9, 2017

(30) Foreign Application Priority Data
Aug. 7, 2015 (CN) .......................... 2015 1 0483968

(51) Int. Cl.
*G06F 21/00* (2013.01)
*G06F 21/71* (2013.01)
(Continued)

(52) U.S. Cl.
CPC .............. *G06F 21/71* (2013.01); *G06F 8/315* (2013.01); *G06F 21/606* (2013.01); *G06F 21/78* (2013.01); *G06N 7/005* (2013.01)

(58) Field of Classification Search
None
See application file for complete search history.

(56) References Cited

U.S. PATENT DOCUMENTS 7,127,605 B1 * 10/2006 Montgomery .......... G06F 21/53
713/150
8,646,059 B1 2/2014 von Behren et al.
(Continued)

FOREIGN PATENT DOCUMENTS

CN 101404592 A 4/2009

OTHER PUBLICATIONS

From CN 201510483968.9, Office Action dated Sep. 29, 2017 with machine English translation from Global Dossier.
(Continued)

*Primary Examiner* — Andrew J Steinle
(74) *Attorney, Agent, or Firm* — Ladas & Parry, LLP

(57) ABSTRACT

The present disclosure discloses a method and device for invoking a JAVA card object. The method comprises: receiving, by a JCRE, a service request message transmitted by an application $Applet_1$; acquiring, by the JCRE, interaction information between the $Applet_1$ and the $Applet_2$ according to an ID of the $Applet_1$ and an ID of the $Applet_2$; acquiring, by the JCRE, a trust degree between the $Applet_1$ and the $Applet_2$ according to the interaction information between the $Applet_1$ and the $Applet_2$, information about one interaction comprising service class information for this interaction and information about whether a service request task of the $Applet_1$ succeeds after this interaction; and determining, by the JCRE, that the $Applet_1$ invokes a shared interface service of the $Applet_2$, when the trust degree reaches a trust degree threshold.

18 Claims, 3 Drawing Sheets

(51) Int. Cl.
 G06F 8/30 (2018.01)
 G06F 21/78 (2013.01)
 G06F 21/60 (2013.01)
 G06N 7/00 (2006.01)

(56) References Cited

U.S. PATENT DOCUMENTS

2014/0149571 A1* 5/2014 Christensen ........ H04L 43/0811
 709/224
2015/0286818 A1* 10/2015 Lu ........................... G06F 21/50
 726/2

OTHER PUBLICATIONS

Jøsang et al., "Optimal Trust Network Analysis with Subjective Logic"; The Second International Conference on Emerging Security Information, Systems, and Technologies; 2008 IEEE; pp. 179-184.
Longlong, "JCVM Related Security Analysis and Optimization"; Masters of Law, Guangdong University of Technology; 2014; pp. 135-151; including English abstract and Google English translation.

* cited by examiner

METHOD AND DEVICE FOR INVOKING JAVA CARD OBJECT

CROSS-REFERENCE TO RELATED APPLICATION

This application claims the priority to and the benefit of Chinese Patent Application No. 201510483968.9 titled "METHOD AND DEVICE FOR INVOKING JAVA CARD OBJECT", filed on Aug. 7, 2015, the disclosure of which is incorporated herein by reference in its entirety.

FIELD OF THE DISCLOSURE

The present disclosure relates to the field of smart cards, and in particular to a method and device for invoking a JAVA card object.

BACKGROUND OF THE DISCLOSURE

A storage region inside a JAVA card is divided into different security domains, each one of which corresponds to a set of objects of one type, and the sets are separated by firewalls. Access between objects in a set is legal, while the access between objects in different sets is conditional. Such access to objects in different sets is called an object access mechanism by a shared interface.

SUMMARY OF THE DISCLOSURE

One embodiment of the present disclosure discloses a method for invoking a JAVA card object, including:

receiving, by a JCRE, a service request message transmitted by an application $Applet_1$, the service request message including a service request type, an ID of the $Applet_1$ and an ID of $Applet_2$;

acquiring, by the JCRE, interaction information between the $Applet_1$ and the $Applet_2$ according to the ID of the $Applet_1$ and the ID of the $Applet_2$;

acquiring, by the JCRE, a trust degree between the $Applet_1$ and the $Applet_2$ according to the interaction information between the $Applet_1$ and the $Applet_2$, information about one interaction including service class information for this interaction and information about whether a service request task of the $Applet_1$ succeeds after this interaction; and determining, by the JCRE, that the $Applet_1$ invokes a shared interface service of the $Applet_2$, when the trust degree reaches a trust degree threshold.

In another embodiment of the present invention, a device for invoking a JAVA card object is provided, including a memory, a receiver, a process and a bus system, the memory, the receiver and the processor being coupled by the bus system, wherein the receiver is configured to receive a service request message transmitted by an application $Applet_1$, the service request message including a service request type, an ID of the $Applet_1$ and an ID of $Applet_2$;

the memory is configured to store programs;

the processor is configured to read programs in the memory and perform the following operations:

acquiring interaction information between the $Applet_1$ and the $Applet_2$ according to the ID of the $Applet_1$ and the ID of the $Applet_2$;

acquiring a trust degree between the $Applet_1$ and the $Applet_2$ according to the interaction information between the $Applet_1$ and the $Applet_2$, information about one interaction including service class information for this interaction and information about whether the service request task of the $Applet_1$ succeeds after this interaction; and determining that the $Applet_1$ invokes a shared interface service of the $Applet_2$, when the trust degree reaches a trust degree threshold.

BRIEF DESCRIPTION OF THE DRAWINGS

In order to describe the technical solutions in embodiments of the present disclosure or in the prior art more clearly, the accompanying drawings to be used in the description of embodiments or the prior art will be introduced briefly. Obviously, the accompanying drawings to be described below merely some embodiments of the present disclosure, and a person of ordinary skill in the art can obtain other drawings according to these drawings without paying any creative effort.

DETAILED DESCRIPTION OF THE PREFERRED EMBODIMENTS

Technical solutions in the embodiments of the present disclosure will be described clearly and completely with reference to the accompanying drawings in the embodiments of the present disclosure. Obviously, the described embodiments are merely some but not all of embodiments of the present disclosure. Based on the embodiments of the present disclosure, all other embodiments obtained by a person of ordinary skill in the art without paying any creative effort shall fall into the protection scope of the disclosure.

Currently, when a first Applet (an application) in a set invokes a shared interface service of a second Applet in another set, the first Applet transmits a shared interface service request message to the second Applet by a JCRE (Java Card Runtime Environment). The second Applet verifies whether to open the shared interface service according to a preset rule. If the verification succeeds, the first Applet can invoke the shared interface service of the second Applet. Wherein, the JCRE is the center part of the JAVA card, mainly responsible for maintaining the environment when the JAVA card is running, and meanwhile responsible for executing an application and partially maintaining security.

The preset rule is generally set in advance. For example, all the Applets inside a JAVA card are set in different classes. Applets of a high class can unconditionally invoke shared interface services of Applets of a low class. Most of such rules are based on human experiences or some simple logical judgments. Since continuous interactions between Applets inside the JAVA card and the increase or decrease in the number of Applets inside the JAVA card will cause the runtime environment inside the JAVA card to change, the use of fixed rules cannot be adapted to dynamic changes in the runtime environment inside the JAVA card. As a result, the security during interaction between Applets is decreased.

Figure 1:
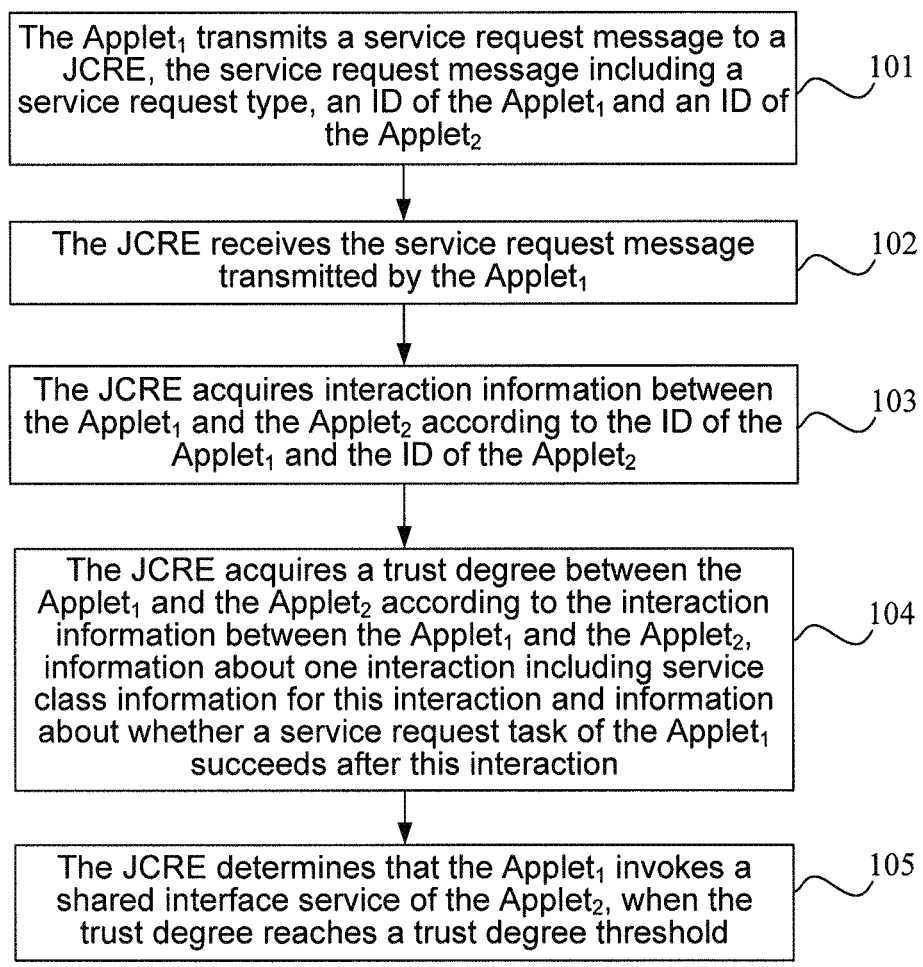
FIG. 1 is a flowchart of a method for invoking a JAVA card object according to one embodiment of the present disclosure.

One embodiment of the present disclosure provides a method for invoking a JAVA card object, which can be applied in smart cards, for example, in JAVA cards. In such a case, an Applet$_1$ and an Applet$_2$ can be two Applets from different security domains in the JAVA card. As shown in FIG. 1, this method includes the following steps.

101. The Applet$_1$ transmits a service request message to a JCRE, the service request message including a service request type, an ID of the Applet$_1$ and an ID of the Applet$_2$.

It should be noted that, each Applet in a JAVA card has a unique ID; and if an ID of an Applet is known, the JCRE can find a storage location of the Applet and interaction information between the Applet and other Applets according to the ID.

The Applet$_1$ can determine whether the Applet$_2$ is in a same security domain as the Applet$_1$ before transmitting the service request message. If the Applet$_2$ is in a same security domain as the Applet$_1$, the Applet$_1$ directly invokes the shared interface service of the Applet$_2$. If the Applet$_2$ is not in a same security domain as the Applet$_1$, the Applet$_1$ transmits a service request message to the JCRE.

102. The JCRE receives the service request message transmitted by the Applet$_1$.

103. The JCRE acquires interaction information between the Applet$_1$ and the Applet$_2$ according to the ID of the Applet$_1$ and the ID of the Applet$_2$.

In this step, the interaction information is historical interaction information between the Applet$_1$ and the Applet$_2$. Interaction between the Applet$_1$ and the Applet$_2$ can include direct interaction and/or indirect interaction. Indirect interaction is interaction between the Applet$_1$ and the Applet$_2$ performed by other Applets. There can be one or more direct interactions and indirect interactions between two Applets.

The service request type can be, for example, installation, deletion, update or the like of an Applet. In the embodiment of the present disclosure, the service request type is a shared interface service. When the JCRE determines that the service request type is a shared interface service, the JCRE acquires direct interaction information and/or indirect interaction information between the Applet$_1$ and the Applet$_2$ according to the ID of the Applet$_1$ and the ID of the Applet$_2$.

104. The JCRE acquires a trust degree between the Applet$_1$ and the Applet$_2$ according to the interaction information between the Applet$_1$ and the Applet$_2$, information about one interaction including service class information for this interaction and information about whether a service request task of the Applet$_1$ succeeds after this interaction.

Exemplarily, in accordance with the international standards, the service class can be divided into the following four classes, respectively, LoA1: basic services requiring no identity verification, for example, a simple page jump; LoA2: simple identity verification services, i.e., identity authentication services requiring no password verification; LoA3: password identity verification services, including logging-in services by passwords such as MicroBlog, Wechat and the like; and LoA4: high security level services requiring identity verification by a public key certificate, for example, services such as bank payment. Wherein, LoA4 is the highest service class, while LoA1 is the lowest service class.

Exemplarily, the JCRE can calculate a trust degree between the Applet$_1$ and the Applet$_2$ according to a Jøsang trust evaluation model, a Beth trust evaluation model, and a cloud model, and the like.

105. The JCRE determines that the Applet$_1$ invokes a shared interface service of the Applet$_2$, when the trust degree reaches a trust degree threshold.

In one embodiment of the present disclosure, the step 104 can include the following steps.

1041. The JCRE acquires a direct trust degree between the Applet$_1$ and the Applet$_2$ according to the direct interaction information between the Applet$_1$ and the Applet$_2$.

1042. The JCRE acquires an indirect trust degree between the Applet$_1$ and the Applet$_2$ according to the indirect interaction information between the Applet$_1$ and the Applet$_2$.

1043. The JCRE acquires a trust degree between the Applet$_1$ and the Applet$_2$ according to the direct trust degree and the indirect trust degree.

In the steps 1041 to 1043, the calculation of the direct trust degree depends on the direct interaction between the Applet$_1$ and the Applet$_2$, and also the calculation of the indirect trust degree depends on the indirect interaction between the Applet$_1$ and the Applet$_2$, so that, in a case where there are few direct interactions between the Applet$_1$ and the Applet$_2$, the security of the Applet$_1$ can still be promised.

In one embodiment of the present disclosure, when the step 1041 is implemented, the JCRE can acquire the direct trust degree between the Applet$_1$ and the Applet$_2$ according to information about all the direct interactions between the Applet$_1$ and the Applet$_2$. When the step 1042 is implemented, the JCRE can acquire a sub-indirect trust degree corresponding to each indirect interaction according to information about each indirect interaction between the Applet$_1$ and the Applet$_2$, and all the sub-indirect trust degrees are aggregated as the indirect trust degree.

For example, after the Applet$_1$ invokes the shared interface service of the Applet$_2$, the Applet$_1$ can acquire the desired data from the Applet$_2$.

Wherein, the trust degree threshold can be specifically determined according to specific application scenarios, and is not limited in the embodiment of the present disclosure. For example, in a case where the ID of the Applet$_1$ and the ID of the Applet$_2$ are included in the service request message, when the trust degree includes a probability of trust between the Applet$_1$ and the Applet$_2$, a probability of distrust between the Applet$_1$ and the Applet$_2$, and a probability of uncertainty of whether trust exists between the Applet$_1$ and the Applet$_2$, the JCRE can determine whether the Applet$_1$ invokes the shared interface service of the Applet$_2$ just according to the values of the three parameters in the trust degree.

In one embodiment of the present disclosure, the service request message further includes service class information. In this case, the JCRE can determine whether the Applet$_1$ invokes the shared interface service of the Applet$_2$ according to the values of the three parameters in the trust degree and the service class.

In one embodiment of the present disclosure, after the Applet$_1$ ends the invoking of the shared interface service of the Applet$_2$, the method further includes:

updating the direct trust degree between the Applet$_1$ and the Applet$_2$, and storing the direct trust degree in a memory.

After the direct trust degree between the Applet$_1$ and the Applet$_2$ is updated and stored in the memory, when the Applet$_1$ requests again to the JCRE for invoking the shared interface service of the Applet$_2$, the JCRE can acquire the direct trust degree between the Applet$_1$ and the Applet$_2$ directly.

Exemplarily, the method for calculating the direct trust degree between the Applet$_1$ and the Applet$_2$ can refer to the description below.

With regard to the method provided by the embodiment of the present disclosure, after the JCRE acquires interaction information between the Applet$_1$ and the Applet$_2$, due to the fact that the higher the service class included in the interaction information is and the service request task of the $Applet_1$ succeeds after the interaction ends, the higher the trust degree between the $Applet_1$ and the $Applet_2$ is, a trust degree between the $Applet_1$ and the $Applet_2$ can be determined according to the interaction information between the $Applet_1$ and the $Applet_2$. After a trust degree threshold is set appropriately, only when the trust degree reaches the trust degree threshold, the $Applet_1$ can be determined to invoke the shared interface service of the $Applet_2$. Compared with the prior art, when the JCRE receives a service request message from any Applet for invoking a shared interface service of another Applet, the JCRE may acquire the trust degree between this Applet and the another Applet according to the interaction information between this Applet and the another Applet. In this way, with the method provided by the embodiment of the present disclosure, dynamic changes in the runtime environment inside the JAVA card may be adapted, so that the security during interaction between Applets may be enhanced.

Figure 2:
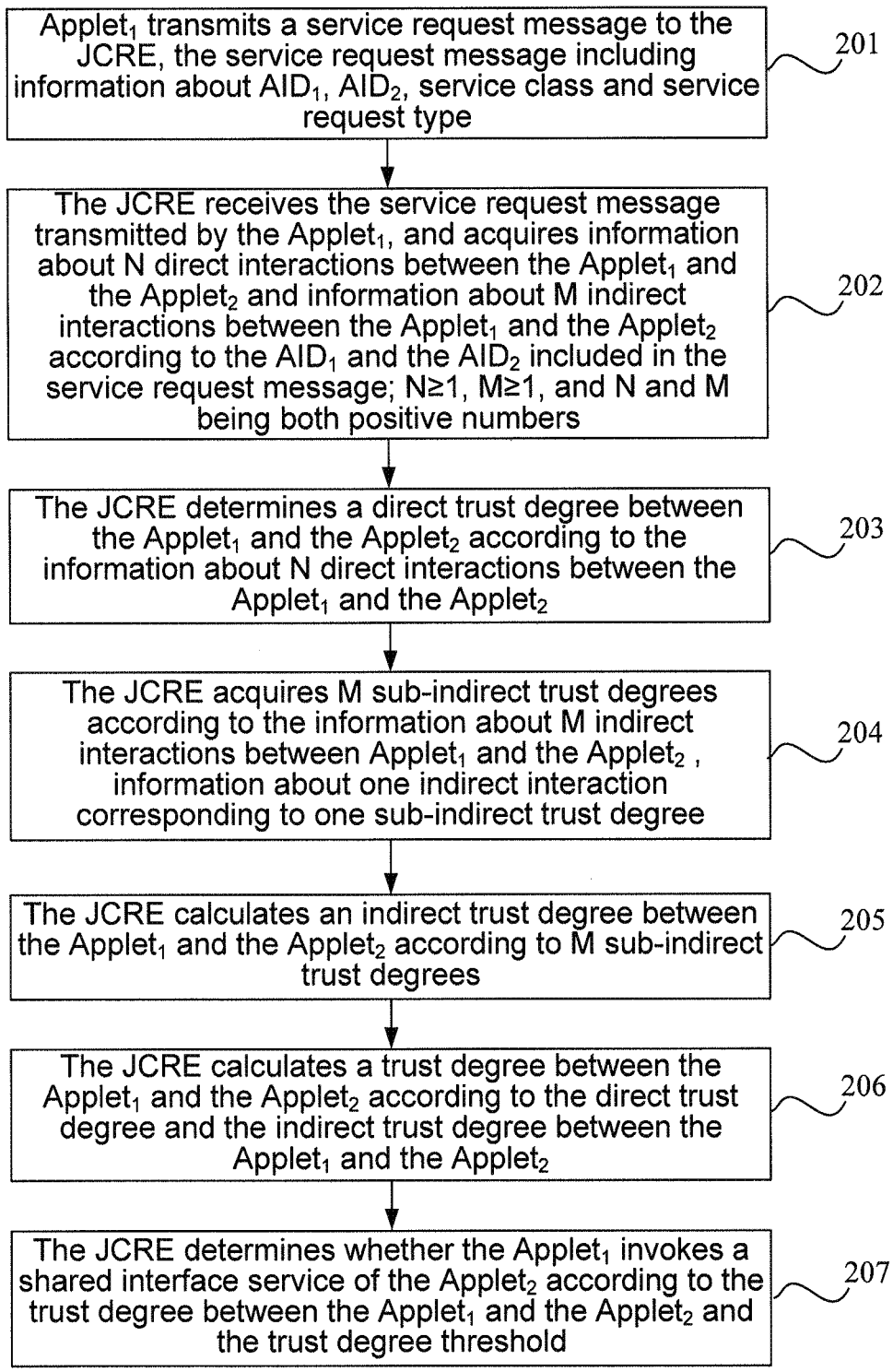
FIG. 2 is a flowchart of another method for invoking a JAVA card object according to one embodiment of the present disclosure.

Some embodiments of the present disclosure provide a method for invoking a JAVA card object, used to make a further illustrative description to the method for invoking a JAVA object provided by the above embodiment. As shown in FIG. 2, the method includes the following steps.

201. $Applet_1$ transmits a service request message to the JCRE, the service request message including information about $AID_1$, $AID_2$, service class and service request type.

In this embodiment, $AID_i$ is the ID of $Applet_i$, and the service request type is a shared interface service, i≥1, i being an integer.

202. The JCRE receives the service request message transmitted by the $Applet_1$, and acquires information about N direct interactions between the $Applet_1$ and the $Applet_2$ and information about M indirect interactions between the $Applet_1$ and the $Applet_2$ according to the $AID_1$ and the $AID_2$ included in the service request message, N≥1, M≥1, N and M being both integers.

For example, the JCRE can acquire each direct interaction between the $Applet_1$ and other Applets according to the $AID_1$, and acquire each direct interaction between the $Applet_2$ and other Applets according to the $AID_2$.

Figure 3:
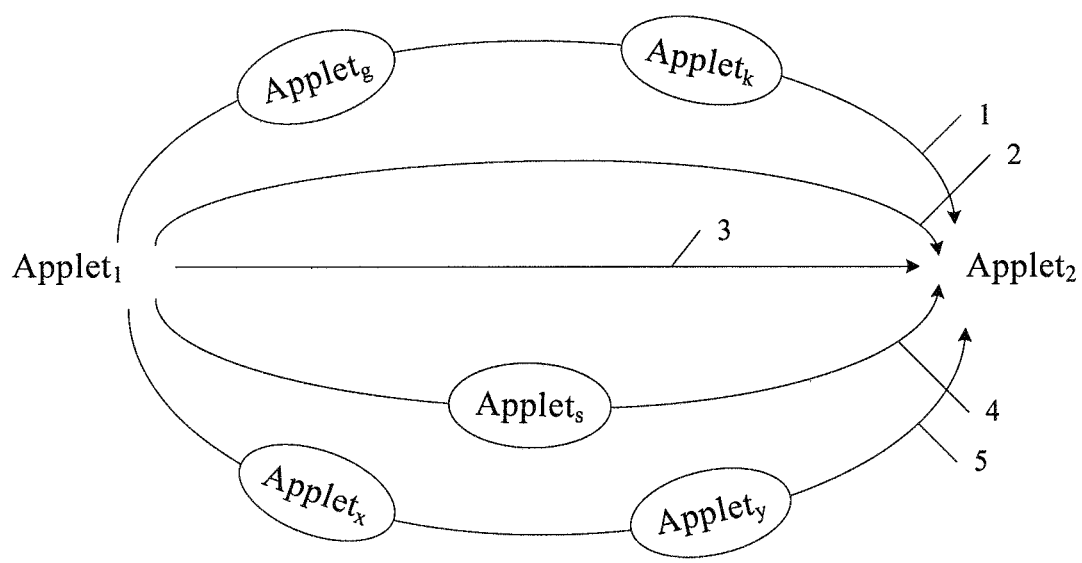
FIG. 3 is a link view of interaction between Applets according to one embodiment of the present disclosure.

Exemplarily, FIG. 3 shows a link view of interaction between the $Applet_1$ and the $Applet_2$, wherein five interaction links are included, among which two (the second link and the third link) are direct interaction links and three (the first link, the fourth link and the fifth link) are indirect interaction links. One direct interaction link corresponds to one direct interaction, while one indirect interaction link corresponds to one indirect interaction.

Wherein, the JCRE can directly acquire the direct interaction between the $Applet_1$ and the $Applet_2$ according to the $AID_1$ or the $AID_2$. When an indirect interaction between the $Applet_1$ and the $Applet_2$ is determined, on the basis of an example shown in FIG. 3, taking the indirect interaction corresponding to the fifth indirect interaction link as an example, the JCRE knows that there has been a direct interaction between the $Applet_1$ and an $Applet_x$ according to the $AID_1$, that there has been a direct interaction between the $Applet_x$ and an $Applet_y$ according to the $AID_x$, that there has been a direct interaction between the $Applet_y$ and the $Applet_2$ according to the $AID_y$. Then, this indirect interaction between the $Applet_1$ and the $Applet_2$ can be determined.

Exemplarily, information about one direct interaction includes a service class of this direct interaction and information about whether the service succeeds. Information about one indirect interaction includes information about direct interactions between T−1 groups of adjacent Applets, and information about direct interactions between a group of adjacent Applets includes information about one or more direct interactions. Wherein, T is the number of the Applets constituting the indirect interaction link corresponding to this indirect interaction; a group of adjacent Applets means two adjacent Applets in this indirect interaction link; T≥3, T being an integer. For example, based on the example shown in FIG. 3, taking the indirect interaction corresponding to the fifth indirect interaction link as an example, this indirect interaction link is as follows: $Applet_1$-$Applet_x$-$Applet_y$-$Applet_2$. Information about this indirect interaction includes information about direct interactions between three groups of adjacent Applets, respectively: information about direct interaction between the $Applet_1$ and the $Applet_x$, information about direct interaction between the $Applet_x$ and the $Applet_y$, and information about direct interaction between the $Applet_y$ and the $Applet_2$.

203. The JCRE determines a direct trust degree between the $Applet_1$ and the $Applet_2$ according to the information about N direct interactions between the $Applet_1$ and the $Applet_2$.

Exemplarily, the JCRE can, on the basis of the Jøsang trust evaluation model, express a direct trust degree between an $Applet_i$ and an $Applet_j$ as: $w_{ij}'=(b_{ij}', d_{ij}', u_{ij}')$, where, $w_{ij}'$ denotes a direct trust degree between the $Applet_i$ and the $Applet_j$, $b_{ij}'$ denotes the probability of a direct trust between the $Applet_i$ and the $Applet_j$, $d_{ij}'$ denotes the probability of a direct distrust between the $Applet_i$ and the $Applet_j$, $u_{ij}'$ denotes the probability of uncertainty of whether the direct trust exists between the $Applet_i$ and the $Applet_j$; $b_{ij}'+d_{ij}'+u_{ij}'=1$, j≥1, j being an integer.

Exemplarily, $$\begin{cases} b_{ij}' = \dfrac{\sum_{n=1}^{N} \delta(n)\cdot w(n)}{\sum_{n=1}^{N} \delta(n)\cdot w(n) + \sum_{n=1}^{N} \overline{\delta(n)}\cdot w(n) + 1} \\ d_{ij}' = \dfrac{\sum_{n=1}^{N} \overline{\delta(n)}\cdot w(n)}{\sum_{n=1}^{N} \delta(n)\cdot w(n) + \sum_{n=1}^{N} \overline{\delta(n)}\cdot w(n) + 1} \\ u_{ij}' = \dfrac{1}{\sum_{n=1}^{N} \delta(n)\cdot w(n) + \sum_{n=1}^{N} \overline{\delta(n)}\cdot w(n) + 1} \end{cases}$$

where, $w(n)$ is a weight of the $n^{th}$ direct interaction between the $Applet_i$ and the $Applet_j$, and the value of the $w(n)$ is determined according to a service class of the $n^{th}$ direct interaction; a step function $\delta(n)$ and a step function $\overline{\delta(n)}$ are a pair of inverse functions, when a service request task of the $Applet_i$ succeeds after the $n^{th}$ direct interaction ends, $$\begin{cases} \delta(n) = 1 \\ \overline{\delta(n)} = 0 \end{cases};$$

and when a service request task of the $Applet_i$ fails after the $n^{th}$ direct interaction ends, $$\begin{cases} \delta(n) = 0 \\ \overline{\delta(n)} = 1 \end{cases};$$

and 1≤n≤N, and n and N are both integers.

Exemplarily, when a service class is LoA1, w(n)=1; when a service class is LoA2, w(n)=2; when a service class is LoA3, w(n)=3; and when a service class is LoA4, w(n)=4.

204. The JCRE acquires M sub-indirect trust degrees according to information about M indirect interactions between the $Applet_1$ and the $Applet_2$, information about one indirect interaction corresponding to one sub-indirect trust degree.

In one embodiment, the acquiring a sub-indirect trust degree according to information about $M^{th}$ indirect interaction between the $Applet_1$ and the $Applet_2$ includes:

calculating a sub-indirect trust degree corresponding to the $m^{th}$ indirect interaction between the $Applet_1$ and the $Applet_2$ according to $w_m''=(b_m'',d_m'',u_m'')$ and $$\begin{cases} b_m'' = b_{13}' \otimes b_{34}' \otimes \ldots \otimes b_{T2}' \\ d_m'' = d_{13}' \otimes d_{34}' \otimes \ldots \otimes d_{T2}' \\ u_m'' = u_{13}' \otimes u_{34}' \otimes \ldots \otimes u_{T2}' \end{cases};$$

where, $b_{ij}' \otimes b_{jk}' = b_{ij}' \cdot b_{jk}'$, $d_{ij}' \otimes d_{jk}' = d_{ij}' \cdot d_{jk}'$, $u_{ij}' \otimes u_{jk}' = d_{ij}' + u_{ij}' + b_{ij}' \cdot u_{jk}'$; $w_m''$ denotes a sub-indirect trust degree corresponding to the $m^{th}$ indirect interaction between the $Applet_1$ and the $Applet_2$; $b_m''$ denotes the probability of indirect trust of the $m^{th}$ indirect interaction between the $Applet_1$ and the $Applet_2$; $d_m''$ denotes the probability of indirect distrust of the $m^{th}$ indirect interaction between the $Applet_1$ and the $Applet_2$; $u_m''$ denotes the probability of uncertainty of whether indirect trust exists in the $m^{th}$ indirect interaction between the $Applet_1$ and the $Applet_2$; the $m^{th}$ indirect interaction between the $Applet_1$ and the $Applet_2$ is performed by $Applet_3, Applet_4, \ldots, Applet_T$; $1 \le i \le T$, $1 \le j \le T$, $1 \le k \le T$, $i \ne j \ne k$, $1 \le m \le M$, and i, j, k, m, T are all integers.

It should be noted that, the $Applet_3, Applet_4, \ldots, Applet_T$ only represent Applets passed through during the indirect interaction between the $Applet_1$ and the $Applet_2$ in the $m^{th}$ indirect interaction, and are not specifically denoted.

205. The JCRE calculates an indirect trust degree between the $Applet_1$ and the $Applet_2$ according to M sub-indirect trust degrees.

The JCRE calculates the indirect trust degree between the $Applet_1$ and the $Applet_2$ according to $w''=(b'',d'',u'')$ and $$\begin{cases} b'' = b_1'' * b_2'' * \ldots * b_M'' \\ d'' = d_1'' * d_2'' * \ldots * d_M'' \\ u'' = u_1'' * u_2'' * \ldots * u_M'' \end{cases};$$

wherein, when $u_p'' \ne 0$ or $u_q'' \ne 0$, $w_{pq}''=(b_{pq}'',d_{pq}'',u_{pq}'')$, wherein $$\begin{cases} b_{pq}'' = b_p'' * b_q'' = \dfrac{b_p'' u_q'' + b_q'' u_p''}{\tau} \\ d_{pq}'' = d_p'' * d_q'' = \dfrac{d_p'' u_q'' + d_q'' u_p''}{\tau}, \tau = u_p'' + u_q'' - u_p'' u_q''; \\ u_{pq}'' = u_p'' * u_q'' = \dfrac{u_p'' u_q''}{\tau} \end{cases}$$

When $u_p''=u_q''=0$, $w_{pq}''=(b_{pq}'',d_{pq}'',u_{pq}'')$, wherein $$\begin{cases} b_{pq}'' = b_p'' * b_q'' = \dfrac{b_p'' + b_q''}{2} \\ d_{pq}'' = d_p'' * d_q'' = \dfrac{d_p'' + d_q''}{2}; \\ u_{pq}'' = u_p'' * u_q'' = 0 \end{cases}$$

w" denotes the indirect trust degree between the $Applet_1$ and the $Applet_2$; b" denotes the probability of indirect trust between the $Applet_1$ and the $Applet_2$, d" denotes the probability of indirect distrust between the $Applet_1$ and the $Applet_2$, u" denotes the probability of uncertainty of whether an indirect trust exists between the $Applet_1$ and the $Applet_2$; $w_{pq}''$ denotes an indirect trust degree obtained by calculating according to a sub-indirect trust degree corresponding to the $p^{th}$ indirect interaction and a sub-indirect trust degree corresponding to the $q^{th}$ indirect interaction between the $Applet_1$ and the $Applet_2$; $b_{pq}''$ denotes the probability of indirect trust between the $Applet_1$ and the $Applet_2$ obtained by calculating according to a sub-indirect trust degree corresponding to the $p^{th}$ indirect interaction and a sub-indirect trust degree corresponding to the $q^{th}$ indirect interaction between the $Applet_1$ and the $Applet_2$; $d_{pq}''$ denotes the probability of indirect distrust between the $Applet_1$ and the $Applet_2$ obtained by calculating according to a sub-indirect trust degree corresponding to the $p^{th}$ indirect interaction and a sub-indirect trust degree corresponding to the $q^{th}$ indirect interaction between the $Applet_1$ and the $Applet_2$; $u_{pq}''$ denotes the probability of uncertainty of whether indirect trust exists between the $Applet_1$ and the $Applet_2$ obtained by calculating according to a sub-indirect trust degree corresponding to the $p^{th}$ indirect interaction and a sub-indirect trust degree corresponding to the $q^{th}$ indirect interaction between the $Applet_1$ and the $Applet_2$; and $1 \le p \le M$, $1 \le q \le M$, $p \ne q$, and p and q are both integers.

After $b_{12}''$ is calculated according to $b_1''$ and $b_2''$, this method can also be used when $b_{12}''*b_3''$ is calculated. The same is applicable to other parameters, and will not be further described here.

It should be noted that, when M=1, the sub-indirect trust degree corresponding to this indirect interaction is the indirect trust degree.

206. The JCRE calculates a trust degree between the $Applet_1$ and the $Applet_2$ according to the direct trust degree and the indirect trust degree between the $Applet_1$ and the $Applet_2$.

The trust degree between the $Applet_1$ and the $Applet_2$: $w=(b,d,u)=\alpha w'+\beta w''$, wherein $\alpha+\beta=1$, and $\alpha,\beta \in [0,1]$.

Wherein, weight coefficients $\alpha$ and $\beta$ are empirical values, $\alpha$ denotes a proportion of the direct trust degree in the calculation of trust degree, and $\beta$ denotes a proportion of the indirect trust degree in the calculation of trust degree. When there are intensive direct interactions between the $Applet_1$ and the $Applet_2$, $\alpha > \beta$ is suggested; and when there are intensive indirect interactions between the $Applet_1$ and the $Applet_2$, $\alpha < \beta$ is suggested.

When an Applet which is newly added to the JAVA card is to invoke a shared interface service of another Applet, since there are few direct interactions between the newly-added Applet and other Applets, it is unable to acquire direct interaction information between the newly-added Applet and other Applets. In this case, a trust degree between the newly-added Applet and other Applets can be calculated by using an Applet similar to the newly-added Applet. Determination of a similar Applet can be made by comparing similarity in context environments of two Applets.

207. The JCRE determines whether the $Applet_1$ invokes the shared interface service of the $Applet_2$ according to the trust degree between the $Applet_1$ and the $Applet_2$ and the trust degree threshold.

Exemplarily, the JCRE can determine whether the $Applet_1$ invokes the shared interface service of the $Applet_2$ according to the following trust degree thresholds:

When $b \ge 0.8$ in $w=(b,d,u)$, it is considered that there is an absolute trust between the $Applet_1$ and the $Applet_2$, and services of all types can be performed;

when 0.5≤b<0.8 in w=(b,d,u), it is considered that there is a sufficient trust between the $Applet_1$ and the $Applet_2$, and services of all types below LOA3 class can be performed;

when b, d and u are all less than or equal to 0.4 in w=(b,d,u), it is considered that there is a basic trust between the $Applet_1$ and the $Applet_2$, and services of all types below LOA2 class can be performed;

when 0.5≤d<0.8 in w=(b,d,u), it is considered that there is no trust between the $Applet_1$ and the $Applet_2$, and only services of a type in the LOA1 class can be performed; and when d≥0.8 in w=(b,d,u), it is considered that there is a threat to security between the $Applet_1$ and the $Applet_2$, and services of any type cannot be performed.

The trust degree threshold can be specifically determined according to specific application scenarios, and is not limited in the embodiment of the present disclosure.

In addition, one trust degree threshold can be set for the $Applet_1$ and the $Applet_2$, respectively: $w_{T1}$ and $w_{T2}$. The JCRE can determine whether the $Applet_1$ can invoke the shared interface service of the $Applet_2$ according to w=(b,d,u) as well as $w_{T1}$ and $w_{T2}$. For example, when the values of parameters in w=(b,d,u) are greater than or equal to values of corresponding parameters in $w_{T1}$ and $w_{T2}$, the $Applet_1$ can invoke the shared interface service of the $Applet_2$.

Wherein, the $Applet_1$ can transmit $w_{T1}$ to the JCRE in a service request message. When the JCRE receives the service request message transmitted by the $Applet_1$, the JCRE transmits the service request message to the $Applet_2$; and when the $Applet_2$ receives the service request message transmitted by the JCRE, $w_{T2}$ is fed back to the JCRE by the $Applet_2$.

With regard to the method provided by the embodiment of the present disclosure, after the JCRE acquires interaction information between the $Applet_1$ and the $Applet_2$, due to the fact that the higher the service class included in the interaction information is and the service request task of the $Applet_1$ succeeds after the interaction ends, the higher the trust degree between the $Applet_1$ and the $Applet_2$ is, a trust degree between the $Applet_1$ and the $Applet_2$ can be determined according to the interaction information between the $Applet_1$ and the $Applet_2$. After a trust degree threshold is set appropriately, only when the trust degree reaches the trust degree threshold, the $Applet_1$ can be determined to invoke the shared interface service of the $Applet_2$. Compared with the prior art, when the JCRE receives a service request message from any Applet for invoking a shared interface service of another Applet, the JCRE may acquire the trust degree between this Applet and the another Applet according to the interaction information between this Applet and the another Applet. In this way, with the method provided by the embodiment of the present disclosure, dynamic changes in the runtime environment inside the JAVA card may be adapted, so that the security during interaction between Applets may be enhanced.

Figure 4:
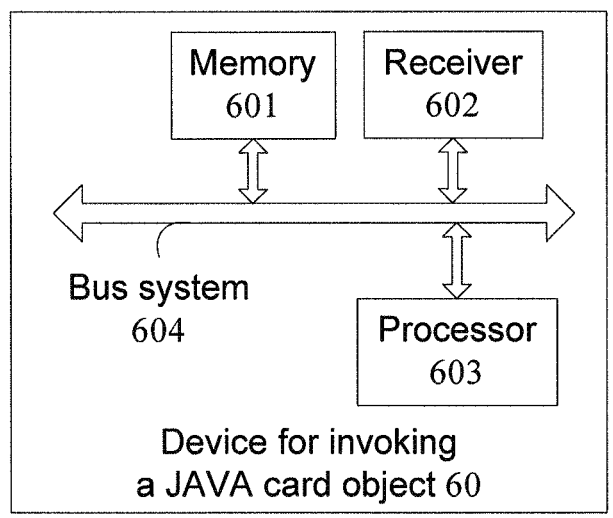
FIG. 4 is a schematic structure diagram of a device for invoking a JAVA card object according to one embodiment of the present disclosure.

As shown in FIG. 4, some embodiments of the present disclosure provides a device 60 for invoking a JAVA card object, configured to perform the method for invoking a JAVA card object shown in FIG. 1. The device 60 includes: a memory 601, a receiver 602, a processor 603 and a bus system 604.

Wherein, the memory 601, the receiver 602 and the processor 603 are coupled together by the bus system 604, wherein the memory 601 might contain a random access memory, might also include a nonvolatile memory, for example, at least one magnetic disk memory. The bus system 604 can be an ISA bus, a PCI bus, or an EISA bus, or the like. The bus system 604 can be divided into an address bus, a data bus, and a control bus, and the like. For ease of illustration, in FIG. 6, the bus system 604 is illustrated by only a thick line. This does not mean that the bus system consists of only one bus or buses of one type.

The receiver 602 is configured to receive a service request message transmitted by an application $Applet_1$, the service request message including a service request type, an ID of the $Applet_1$ and an ID of $Applet_2$.

The memory 601 is configured to store a group of codes which are used to control the processor 603 to perform the following operations:

acquiring interaction information between the $Applet_1$ and the $Applet_2$ according to the ID of the $Applet_1$ and the ID of the $Applet_2$; acquiring a trust degree between the $Applet_1$ and the $Applet_2$ according to the interaction information between the $Applet_1$ and the $Applet_2$, information about one interaction including service class information for this interaction and information about whether the service request task of the $Applet_1$ succeeds after this interaction; and when the trust degree reaches a trust degree threshold, determining that the $Applet_1$ invokes a shared interface service of the $Applet_2$.

Optionally, the processor 603 is configured to: acquire a direct trust degree between the $Applet_1$ and the $Applet_2$ according to the direct interaction information between the $Applet_1$ and the $Applet_2$; acquire an indirect trust degree between the $Applet_1$ and the $Applet_2$ according to the indirect interaction information between the $Applet_1$ and the $Applet_2$; and acquire a trust degree between the $Applet_1$ and the $Applet_2$ according to the direct trust degree and the indirect trust degree.

Optionally, the processor 603 is configured to:

calculate a direct trust degree between the $Applet_1$ and the $Applet_2$ according to $$w' = (b', d', u') \text{ and } \begin{cases} b' = \dfrac{\sum_{n=1}^{N} \delta(n) \cdot w(n)}{\sum_{n=1}^{N} \delta(n) \cdot w(n) + \sum_{n=1}^{N} \overline{\delta(n)} \cdot w(n) + 1} \\ d' = \dfrac{\sum_{n=1}^{N} \overline{\delta(n)} \cdot w(n)}{\sum_{n=1}^{N} \delta(n) \cdot w(n) + \sum_{n=1}^{N} \overline{\delta(n)} \cdot w(n) + 1} \\ u' = \dfrac{1}{\sum_{n=1}^{N} \delta(n) \cdot w(n) + \sum_{n=1}^{N} \overline{\delta(n)} \cdot w(n) + 1} \end{cases} ;$$

where, w' denotes the direct trust degree between the $Applet_1$ and the $Applet_2$, b' denotes the probability of a direct trust between the $Applet_1$ and the $Applet_2$, d' denotes the probability of a direct distrust between the $Applet_1$ and the $Applet_2$, u' denotes the probability of uncertainty of whether the direct trust exists between the $Applet_1$ and the $Applet_2$; N is the total number of direct interactions between the $Applet_1$ and the $Applet_2$; w(n) is a weight of the $n^{th}$ direct interaction between the $Applet_1$ and the $Applet_2$, and the value of the w(n) is determined according to a service class of the $n^{th}$ direct interaction; a step function δ(n) and a step function $\overline{\delta(n)}$ are a pair of inverse functions, when a service request task of the $Applet_1$ succeeds after the $n^{th}$ direct interaction ends, $$\begin{cases} \delta(n) = 1 \\ \delta(n) = 0 \end{cases};$$

and when a service request task of the Applet$_1$ fails after the $n^{th}$ direct interaction ends, $$\begin{cases} \delta(n) = 0 \\ \delta(n) = 1 \end{cases};$$

and $1 \leq n \leq N$, and n and N are both integers.

Optionally, the processor 603 is configured to:

acquire M sub-indirect trust degrees according to information about M indirect interactions between Applet$_1$ and the Applet$_2$, information about one indirect interaction corresponding to one sub-indirect trust degree; and calculate an indirect trust degree between the Applet$_1$ and the Applet$_2$ according to the M sub-indirect trust degrees, $M \geq 1$, M being an integer.

Optionally, the processor 603 is configured to:

calculate a sub-indirect trust degree corresponding to the $m^{th}$ indirect interaction between the Applet$_1$ and the Applet$_2$ according to $w_m''=(b_m'',d_m'',u_m'')$ and $$\begin{cases} b_m'' = b_{13}' \otimes b_{34}' \otimes \ldots \otimes b_{T2}' \\ d_m'' = d_{13}' \otimes d_{34}' \otimes \ldots \otimes d_{T2}' \\ u_m'' = u_{13}' \otimes u_{34}' \otimes \ldots \otimes u_{T2}' \end{cases};$$

where, $b_{ij}' \otimes b_{jk}' = b_{ij}' \cdot b_{jk}'$, $d_{ij}' \otimes d_{jk}' = d_{ij}' \cdot d_{jk}'$, $u_{ij}' \otimes u_{jk}' = d_{ij}' + u_{ij}' + b_{ij}' \cdot u_{jk}'$; $w_m''$ denotes a sub-indirect trust degree corresponding to the $m^{th}$ indirect interaction between the Applet$_1$ and the Applet$_2$; $b_m''$ denotes the probability of indirect trust of the $m^{th}$ indirect interaction between the Applet$_1$ and the Applet$_2$; $d_m''$ denotes the probability of indirect distrust of the $m^{th}$ indirect interaction between the Applet$_1$ and the Applet$_2$; $u_m''$ denotes the probability of uncertainty of whether indirect trust exists in the $m^{th}$ indirect interaction between the Applet$_1$ and the Applet$_2$; $b_{ij}'$ denotes the probability of direct trust between the Applet$_i$ and the Applet$_j$; $d_{ij}'$ denotes the probability of direct distrust between the Applet$_i$ and the Applet$_j$; $u_{ij}'$ denotes the probability of uncertainty of whether direct trust exists between the Applet$_i$ and the Applet$_j$; the $m^{th}$ indirect interaction between the Applet$_1$ and the Applet$_2$ is performed by Applet$_3$, Applet$_4$, ..., Applet$_T$; $1 \leq i \leq T$, $1 \leq j \leq T$, $1 \leq k \leq T$, $i \neq j \neq k$, $1 \leq m \leq M$, and i, j, k, m, T are all integers.

Optionally, the processor 603 is configured to:

calculate an indirect trust degree between the Applet$_1$ and the Applet$_2$ according to $w''=(b'',d'',u'')$ and $$\begin{cases} b'' = b_1'' * b_2'' * \ldots * b_M'' \\ d'' = d_1'' * d_2'' * \ldots * d_M'' \\ u'' = u_1'' * u_2'' * \ldots * u_M'' \end{cases};$$

wherein, when $u_p'' \neq 0$ or $u_q'' \neq 0$, $w_{pq}''=(b_{pq}'',d_{pq}'',u_{pq}'')$, wherein $$\begin{cases} b_{pq}'' = b_p'' * b_q'' = \dfrac{b_p'' u_q'' + b_q'' u_p''}{\tau} \\ d_{pq}'' = d_p'' * d_q'' = \dfrac{d_p'' u_q'' + d_q'' u_p''}{\tau}, \tau = u_p'' + u_q'' - u_p'' u_q''; \\ u_{pq}'' = u_p'' * u_q'' = \dfrac{u_p'' u_q''}{\tau} \end{cases}$$

When $u_p''=u_q''=0$, $w_{pq}''=(b_{pq}'',d_{pq}'',u_{pq}'')$, wherein $$\begin{cases} b_{pq}'' = b_p'' * b_q'' = \dfrac{b_p'' + b_q''}{2} \\ d_{pq}'' = d_p'' * d_q'' = \dfrac{d_p'' + d_q''}{2}; \\ u_{pq}'' = u_p'' * u_q'' = 0 \end{cases}$$

w'' denotes the indirect trust degree between the Applet$_1$ and the Applet$_2$; b'' denotes the probability of indirect trust between the Applet$_1$ and the Applet$_2$, d'' denotes the probability of indirect distrust between the Applet$_1$ and the Applet$_2$, u'' denotes the probability of uncertainty of whether an indirect trust exists between the Applet$_1$ and the Applet$_2$; $w_{pq}''$ denotes an indirect trust degree obtained by calculating according to a sub-indirect trust degree corresponding to the $p^{th}$ indirect interaction and a sub-indirect trust degree corresponding to the $p^{th}$ indirect interaction between the Applet$_1$ and the Applet$_2$; $b_{pq}''$ denotes the probability of indirect trust between the Applet$_1$ and the Applet$_2$ obtained by calculating according to a sub-indirect trust degree corresponding to the $p^{th}$ indirect interaction and a sub-indirect trust degree corresponding to the $q_{th}$ indirect interaction between the Applet$_1$ and the Applet$_2$; $d_{pq}''$ denotes the probability of indirect distrust between the Applet$_1$ and the Applet$_2$ obtained by calculating according to a sub-indirect trust degree corresponding to the $p^{th}$ indirect interaction and a sub-indirect trust degree corresponding to the $q^{th}$ indirect interaction between the Applet$_1$ and the Applet$_2$; $u_{pq}''$ denotes the probability of uncertainty of whether indirect trust exists between the Applet$_1$ and the Applet$_2$ obtained by calculating according to a sub-indirect trust degree corresponding to the $p^{th}$ indirect interaction and a sub-indirect trust degree corresponding to the $q^{th}$ indirect interaction between the Applet$_1$ and the Applet$_2$; and $1 \leq p \leq M$, $1 \leq q \leq M$, $p \neq q$, and p and q are both integers.

Optionally, the processor 603 is configured to:

acquire a trust degree between the Applet$_1$ and the Applet$_2$ according to $w=(b,d,u)=\alpha w'+\beta w''$, wherein $\alpha+\beta=1$, $\alpha,\beta \in [0,1]$; and w denotes the trust degree between the Applet$_1$ and the Applet$_2$.

Optionally, the service request message further includes service class information.

Optionally, the processor 603 is also configured to:

update the direct trust degree between the Applet$_1$ and the Applet$_2$, and store the direct trust degree in a memory.

With regard to the device provided by the embodiment of the present disclosure, after the JCRE acquires interaction information between the Applet$_1$ and the Applet$_2$, due to the fact that the higher the service class included in the interaction information is and the service request task of the Applet$_1$ succeeds after the interaction ends, the higher the trust degree between the Applet$_1$ and the Applet$_2$ is, a trust degree between the Applet$_1$ and the Applet$_2$ can be determined according to the interaction information between the Applet$_1$ and the Applet$_2$. After a trust degree threshold is set appropriately, only when the trust degree reaches the trust degree threshold, the $Applet_1$ can be determined to invoke the shared interface service of the $Applet_2$. Compared with the prior art, when the device receives a service request message from any Applet for invoking a shared interface service of another Applet, the device may acquire the trust degree between this Applet and the another Applet according to the interaction information between this Applet and the another Applet. In this way, with the device provided by the embodiment of the present disclosure, dynamic changes in the runtime environment inside the JAVA card may be adapted, so that the security during interaction between Applets may be enhanced.

As for hardware implementation, units in the device 60 can be embedded in or independently of the processor of the device 60 in the form of hardware, and can also be stored in the memory of the device 60 in the form of software, so that the processor can invoke and perform the operations corresponding to the units mentioned above. The processor may be a central processing unit (CPU), a microprocessor, a single-chip microcomputer or the like.

In the several embodiments provided in the present application, it should be understood that the disclosed devices and methods can be implemented in other ways. For example, the device embodiments described above are merely illustrative. For example, the division of the modules is merely division according to logic function. In practice, there may be other divisions, for example, a plurality of modules or assemblies may be combined or integrated into another system, or some features may be omitted or not executed.

The modules described as separating components may or may not be physically separated. The components displayed as modules may or may not be physical modules. That is, they may be in one location or distributed across a plurality of network units. Some or all of the units may be selected to implement the purpose of the solution of the embodiments as needed.

In addition, each module in the embodiments of the present disclosure can be integrated in one processing module, or can be integrated in one module in two or more. The integrated modules may be implemented in the form of hardware or may be implemented in the form of hardware and software functional modules.

The modules integrated in the form of software functional modules can be stored in a computer-readable memory medium. The software functional modules are stored in one memory medium, including a number of instructions used to enable one computer apparatus (a personal computer, a server, or a network device or the like) to perform partial steps of the methods described in the embodiments of the present disclosure. The storage medium includes various media capable of storing program codes, such as a USB flash disk, a removable hard disk, a read-only memory (ROM), a random access memory (RAM), a magnetic disk or an optical disk.

Finally, it should be noted that, the embodiments are merely used to describe but not to limit the technical solutions of the present disclosure. Although the present disclosure has been described in detail with reference to the foregoing embodiments, it should be understood by a person of ordinary skill in the art that modifications can be made to the technical solutions recorded in the foregoing embodiments, or equivalent replacements can be made to partial technical features therein. And, these modifications and replacements shall not make the essence of the corresponding technical solutions depart from the spirit and scope of the technical solutions of the embodiments of the present disclosure.

What is claimed is:

1. A method for invoking a JAVA card object, comprising:
    receiving, by a JCRE (Java Card Runtime Environment), a service request message transmitted by an application $Applet_1$, the service request message comprising a service request type, an ID of the $Applet_1$ and an ID of an application $Applet_2$;
    acquiring, by the JCRE, historical interaction information between the $Applet_1$ and the $Applet_2$ according to the ID of the $Applet_1$ and the ID of the $Applet_2$;
    determining, by the JCRE, a trust degree between the $Applet_1$ and the $Applet_2$ according to the historical interaction information between the $Applet_1$ and the $Applet_2$, information about one interaction comprising service class information for this interaction and information about whether a service request task of the $Applet_1$ succeeds after this interaction; and
    determining, by the JCRE, that the $Applet_1$ is able to invoke a shared interface service of the $Applet_2$, when the determined trust degree reaches a trust degree threshold.

2. The method according to claim 1, wherein the historical interaction information comprises direct interaction information and indirect interaction information, and the determining, by the JCRE, a trust degree between the $Applet_1$ and the $Applet_2$ according to the historical interaction information between the $Applet_1$ and the $Applet_2$ comprises:
    acquiring, by the JCRE, a direct trust degree between the $Applet_1$ and the $Applet_2$ according to the direct interaction information between the $Applet_1$ and the $Applet_2$;
    acquiring, by the JCRE, an indirect trust degree between the $Applet_1$ and the $Applet_2$ according to the indirect interaction information between the $Applet_1$ and the $Applet_2$; and
    determining, by the JCRE, a trust degree between the $Applet_1$ and the $Applet_2$ according to the direct trust degree and the indirect trust degree.

3. The method according to claim 2, wherein the acquiring, by the JCRE, a direct trust degree between the $Applet_1$ and the $Applet_2$ according to the direct interaction information between the $Applet_1$ and the $Applet_2$ comprises:
    calculating, by the JCRE, a direct trust degree between the $Applet_1$ and the $Applet_2$ according to w'=(b',d',u') and $$\begin{cases} b' = \dfrac{\sum\limits_{n=1}^{N} \delta(n) \cdot w(n)}{\sum\limits_{n=1}^{N} \delta(n) \cdot w(n) + \sum\limits_{n=1}^{N} \overline{\delta(n)} \cdot w(n) + 1} \\ d' = \dfrac{\sum\limits_{n=1}^{N} \overline{\delta(n)} \cdot w(n)}{\sum\limits_{n=1}^{N} \delta(n) \cdot w(n) + \sum\limits_{n=1}^{N} \overline{\delta(n)} \cdot w(n) + 1} \\ u' = \dfrac{1}{\sum\limits_{n=1}^{N} \delta(n) \cdot w(n) + \sum\limits_{n=1}^{N} \overline{\delta(n)} \cdot w(n) + 1} \end{cases} ;$$

where, w' denotes the direct trust degree between the $Applet_1$ and the $Applet_2$, b' denotes the probability of direct trust between the $Applet_1$ and the $Applet_2$, d' denotes the probability of direct distrust between the Applet$_1$ and the Applet$_2$, u' denotes the probability of uncertainty of whether the direct trust exists between the Applet$_1$ and the Applet$_2$; N is the total number of direct interactions between the Applet$_1$ and the Applet$_2$; w(n) is a weight of the n$^{th}$ direct interaction between the Applet$_1$ and the Applet$_2$, and the value of the w(n) is determined according to a service class of the n$^{th}$ direct interaction; a step function $\delta(n)$ and a step function $\overline{\delta(n)}$ are a pair of inverse functions, when a service request task of the Applet$_1$ succeeds after the n$^{th}$ direct interaction ends, $$\begin{cases} \delta(n) = 1 \\ \overline{\delta(n)} = 0 \end{cases};$$

and when a service request task of the Applet$_1$ fails after the n$^{th}$ direct interaction ends, $$\begin{cases} \delta(n) = 0 \\ \overline{\delta(n)} = 1 \end{cases};$$

and 1≤n≤N, and n and N are both integers.

4. The method according to claim 3, wherein the acquiring, by the JCRE, an indirect trust degree between the Applet$_1$ and the Applet$_2$ according to the indirect interaction information between the Applet$_1$ and the Applet$_2$ comprises:
acquiring, by the JCRE, M sub-indirect trust degrees according to information about M indirect interactions between the Applet$_1$ and the Applet$_2$, information about one indirect interaction corresponding to one sub-indirect trust degree; and
calculating, by the JCRE, an indirect trust degree between the Applet$_1$ and the Applet$_2$ according to the M sub-indirect trust degrees, M≥1, M being an integer.

5. The method according to claim 4, wherein the acquiring, by the JCRE, one sub-indirect trust degree between the Applet$_1$ and the Applet$_2$ according to information about the m$^{th}$ indirect interaction between the Applet$_1$ and the Applet$_2$ comprises:
calculating, by the JCRE, a sub-indirect trust degree corresponding to the m$^{th}$ indirect interaction between the Applet$_1$ and the Applet$_2$ according to $$w_m'' = (b_m'', d_m'', u_m'') \text{ and } \begin{cases} b_m'' = b_{13}' \otimes b_{34}' \otimes \ldots \otimes b_{T2}' \\ d_m'' = d_{13}' \otimes d_{34}' \otimes \ldots \otimes d_{T2}' \\ u_m'' = u_{13}' \otimes u_{34}' \otimes \ldots \otimes u_{T2}' \end{cases};$$

where, $b_{ij}' \otimes b_{jk}' = b_{ij}' \cdot b_{jk}'$, $d_{ij}' \otimes d_{jk}' = d_{ij}' \cdot d_{jk}'$, $u_{ij}' \otimes u_{jk}' = d_{ij}' + u_{ij}' + b_{ij}' \cdot u_{jk}'$; $w_m''$ denotes a sub-indirect trust degree corresponding to the m$^{th}$ indirect interaction between the Applet$_1$ and the Applet$_2$; $b_m''$ denotes the probability of indirect trust of the m$^{th}$ indirect interaction between the Applet$_1$ and the Applet$_2$; $d_m''$ denotes the probability of indirect distrust of the m$^{th}$ indirect interaction between the Applet$_1$ and the Applet$_2$; $u_m''$ denotes the probability of uncertainty of whether indirect trust exists in the m$^{th}$ indirect interaction between the Applet$_1$ and the Applet$_2$; $b_{ij}'$ denotes the probability of direct trust between the Applet$_i$ and the Applet$_j$; $d_{ij}'$ denotes the probability of direct distrust between the Applet$_i$ and the Applet$_j$; $u_{ij}'$ denotes the probability of uncertainty of whether direct trust exists between the Applet$_i$ and the Applet$_j$; the m$^{th}$ indirect interaction between the Applet$_1$ and the Applet$_2$ is performed by Applet$_3$, Applet$_4$, ..., Applet$_T$; 1≤i≤T, 1≤j≤T, 1≤k≤T, i≠j≠k, 1≤m≤M, and i, j, k, m, T are all integers.

6. The method according to claim 5, wherein the calculating, by the JCRE, an indirect trust degree between the Applet$_1$ and the Applet$_2$ according to the M sub-indirect trust degrees comprises:
calculating, by the JCRE, an indirect trust degree between the Applet$_1$ and the Applet$_2$ according to w''=(b'',d'',u'') and $$\begin{cases} b'' = b_1'' * b_2'' * \ldots * b_M'' \\ d'' = d_1'' * d_2'' * \ldots * d_M'' \\ u'' = u_1'' * u_2'' * \ldots * u_M'' \end{cases},$$

wherein, when $u_p'' \neq 0$ or $u_q'' \neq 0$, $w_{pq}'' = (b_{pq}'', d_{pq}'', u_{pq}'')$, wherein $$\begin{cases} b_{pq}'' = b_p'' * b_q'' = \dfrac{b_p'' u_q'' + b_q'' u_p''}{\tau} \\ d_{pq}'' = d_p'' * d_q'' = \dfrac{d_p'' u_q'' + d_q'' u_p''}{\tau}, \tau = u_p'' + u_q'' - u_p'' u_q''; \\ u_{pq}'' = u_p'' * u_q'' = \dfrac{u_p'' u_q''}{\tau} \end{cases}$$

When $u_p'' = u_q'' = 0$, $w_{pq}'' = (b_{pq}'', d_{pq}'', u_{pq}'')$, wherein $$\begin{cases} b_{pq}'' = b_p'' * b_q'' = \dfrac{b_p'' + b_q''}{2} \\ d_{pq}'' = d_p'' * d_q'' = \dfrac{d_p'' + d_q''}{2}; \\ u_{pq}'' = u_p'' * u_q'' = 0 \end{cases}$$

w'' denotes an indirect trust degree between the Applet$_1$ and the Applet$_2$; b'' denotes the probability of indirect trust between the Applet$_1$ and the Applet$_2$, d'' denotes the probability of indirect distrust between the Applet$_1$ and the Applet$_2$, u'' indicate the probability of uncertainty of whether an indirect trust exists between the Applet$_1$ and the Applet$_2$; $w_{pq}''$ denotes an indirect trust degree obtained by calculating according to a sub-indirect trust degree corresponding to the p$^{th}$ indirect interaction and a sub-indirect trust degree corresponding to the q$^{th}$ indirect interaction between the Applet$_1$ and the Applet$_2$; $b_{pq}''$ denotes the probability of indirect trust between the Applet$_1$ and the Applet$_2$ obtained by calculating according to a sub-indirect trust degree corresponding to the p$^{th}$ indirect interaction and a sub-indirect trust degree corresponding to the q$^{th}$ indirect interaction between the Applet$_1$ and the Applet$_2$; $d_{pq}''$ denotes the probability of indirect distrust between the Applet$_1$ and the Applet$_2$ obtained by calculating according to a sub-indirect trust degree corresponding to the p$^{th}$ indirect interaction and a sub-indirect trust degree corresponding to the q$^{th}$ indirect interaction between the Applet$_1$ and the Applet$_2$; $u_{pq}''$ denotes the probability of uncertainty of whether indirect trust exists between the Applet$_1$ and the Applet$_2$ obtained by calculating according to a sub-indirect trust degree corresponding to the $p^{th}$ indirect interaction and a sub-indirect trust degree corresponding to the $q^{th}$ indirect interaction between the Applet$_1$ and the Applet$_2$; and $1 \le p \le M$, $1 \le q \le M$, $p \ne q$, and p and q are both integers.

7. The method according to claim 6, wherein the calculating, by the JCRE, a trust degree between the Applet$_1$ and the Applet$_2$ according to the direct trust degree and the indirect trust degree comprises:

acquiring, by the JCRE, a trust degree between the Applet$_1$ and the Applet$_2$ according to $w=(b,d,u)=\alpha w'+\beta w''$, wherein $\alpha+\beta=1$, $\alpha,\beta \in [0,1]$; and w denotes the trust degree between the Applet$_1$ and the Applet$_2$.

8. The method according to claim 1, wherein the service request message further comprises service class information.

9. The method according to claim 1, wherein, after the Applet$_1$ ends the invoking of a shared interface service of the Applet$_2$, the method further comprises:

updating, by the JCRE, the direct trust degree between the Applet$_1$ and the Applet$_2$, and storing the direct trust degree in a memory.

10. A device for invoking a JAVA card object, comprising a memory, a receiver, a processor and a bus system, the memory, the receiver and the processor being coupled together by the bus system, wherein the receiver is configured to receive a service request message transmitted by an application Applet$_1$, the service request message comprising a service request type, an ID of the Applet$_1$ and an ID of an application Applet$_2$;

the memory is configured to store programs;

the processor is configured to read programs in the memory and perform the following operations:

acquiring historical interaction information between the Applet$_1$ and the Applet$_2$ according to the ID of the Applet$_1$ and the ID of the Applet$_2$;

determining a trust degree between the Applet$_1$ and the Applet$_2$ according to the historical interaction information between the Applet$_1$ and the Applet$_2$, information about one interaction comprising service class information for this interaction and information about whether the service request task of the Applet$_1$ succeeds after this interaction; and when the trust degree reaches a trust degree threshold, determining that the Applet$_1$ is able to invoke a shared interface service of the Applet$_2$.

11. The device according to claim 10, wherein the processor is configured to:

acquire a direct trust degree between the Applet$_1$ and the Applet$_2$ according to the direct interaction information between the Applet$_1$ and the Applet$_2$;

acquire an indirect trust degree between the Applet$_1$ and the Applet$_2$ according to the indirect interaction information between the Applet$_1$ and the Applet$_2$; and determine a trust degree between the Applet$_1$ and the Applet$_2$ according to the direct trust degree and the indirect trust degree.

12. The device according to claim 11, wherein the processor is configured to:

calculate a direct trust degree between the Applet$_1$ and the Applet$_2$ according to $$w' = (b', d', u') \text{ and } \begin{cases} b' = \dfrac{\sum_{n=1}^{N} \delta(n) \cdot w(n)}{\sum_{n=1}^{N} \delta(n) \cdot w(n) + \sum_{n=1}^{N} \overline{\delta(n)} \cdot w(n) + 1} \\ d' = \dfrac{\sum_{n=1}^{N} \overline{\delta(n)} \cdot w(n)}{\sum_{n=1}^{N} \delta(n) \cdot w(n) + \sum_{n=1}^{N} \overline{\delta(n)} \cdot w(n) + 1} \\ u' = \dfrac{1}{\sum_{n=1}^{N} \delta(n) \cdot w(n) + \sum_{n=1}^{N} \overline{\delta(n)} \cdot w(n) + 1} \end{cases}$$

where, w' denotes the direct trust degree between the Applet$_1$ and the Applet$_2$, b' denotes the probability of direct trust between the Applet$_1$ and the Applet$_2$, d' denotes the probability of direct distrust between the Applet$_1$ and the Applet$_2$, u' denotes the probability of uncertainty of whether the direct trust exists between the Applet$_1$ and the Applet$_2$; N is the total number of direct interactions between the Applet$_1$ and the Applet$_2$; w(n) is a weight of the $n^{th}$ direct interaction between the Applet$_1$ and the Applet$_2$, and the value of the w(n) is determined according to a service class of the $n^{th}$ direct interaction; a step function $\delta(n)$ and a step function $\overline{\delta(n)}$ are a pair of inverse functions, when a service request task of the Applet$_1$ succeeds after the $n^{th}$ direct interaction ends, $$\begin{cases} \delta(n) = 1 \\ \overline{\delta(n)} = 0 \end{cases};$$

and when a service request task of the Applet$_1$ fails after the $n^{th}$ direct interaction ends, $$\begin{cases} \delta(n) = 0 \\ \overline{\delta(n)} = 1 \end{cases};$$

and $1 \le n \le N$, and n and N are both integers.

13. The device according to claim 12, wherein the processor is configured to:

acquire M sub-indirect trust degrees according to information about M indirect interactions between Applet$_1$ and the Applet$_2$, information about one indirect interaction corresponding to one sub-indirect trust degree; and calculate an indirect trust degree between the Applet$_1$ and the Applet$_2$ according to the M sub-indirect trust degrees, $M \ge 1$, M being an integer.

14. The device according to claim 13, wherein the processor is configured to:

calculate a sub-indirect trust degree corresponding to the $m^{th}$ indirect interaction between the Applet$_1$ and the Applet$_2$ according to $w_m''=(b_m'',d_m'',u_m'')$ and $$\begin{cases} b_m'' = b_{13}' \otimes b_{34}' \otimes \ldots \otimes b_{T2}' \\ d_m'' = d_{13}' \otimes d_{34}' \otimes \ldots \otimes d_{T2}' \\ u_m'' = u_{13}' \otimes u_{34}' \otimes \ldots \otimes u_{T2}' \end{cases};$$

where, $b_{ij}' \otimes b_{jk}' = b_{ij}' \cdot b_{jk}'$, $d_{ij}' \otimes d_{jk}' = d_{ij}' \cdot d_{jk}'$, $u_{ij}' \otimes u_{jk}' = d_{ij}' + u_{ij}' + b_{ij}' \cdot u_{jk}'$; $w_m''$ denotes a sub-indirect trust degree corresponding to the $m^{th}$ indirect interaction between the Applet$_1$ and the Applet$_2$; b$_m$" denotes the probability of indirect trust of the m$^{th}$ indirect interaction between the Applet$_1$ and the Applet$_2$; d$_m$" denotes the probability of indirect distrust of the m$^{th}$ indirect interaction between the Applet$_1$ and the Applet$_2$; u$_m$" denotes the probability of uncertainty of whether indirect trust exists in the m$^{th}$ indirect interaction between the Applet$_1$ and the Applet$_2$; b$_{ij}$' denotes the probability of direct trust between the Applet$_i$ and the Applet$_j$; d$_{ij}$' denotes the probability of direct distrust between the Applet$_i$ and the Applet$_j$; u$_{ij}$' denotes the probability of uncertainty of whether direct trust exists between the Applet$_i$ and the Applet$_j$; the m$^{th}$ indirect interaction between the Applet$_1$ and the Applet$_2$ is performed by Applet$_3$, Applet$_4$, . . . ,Applet$_T$; 1≤i≤T, 1≤j≤T, 1≤k≤T, i≠j≠k, and i, j, k, m, T are all integers.

15. The device according to claim 14, wherein the processor is configured to:
calculate an indirect trust degree between the Applet$_1$ and the Applet$_2$ according to w"=(b",d",u") and $$\begin{cases} b'' = b_1'' * b_2'' * \ldots * b_M'' \\ d'' = d_1'' * d_2'' * \ldots * d_M'' \\ u'' = u_1'' * u_2'' * \ldots * u_M'' \end{cases};$$

wherein, when u$_p$"≠0 or u$_q$"≠0, w$_{pq}$"=(b$_{pq}$",d$_{pq}$",u$_{pq}$"), wherein $$\begin{cases} b_{pq}'' = b_p'' * b_q'' = \frac{b_p'' u_q'' + b_q'' u_p''}{\tau} \\ d_{pq}'' = d_p'' * d_q'' = \frac{d_p'' u_q'' + d_q'' u_p''}{\tau}, \tau = u_p'' + u_q'' - u_p'' u_q''; \\ u_{pq}'' = u_p'' * u_q'' = \frac{u_p'' u_q''}{\tau} \end{cases}$$

When u$_p$"=u$_q$"=0, w$_{pq}$"=(b$_{pq}$",d$_{pq}$",u$_{pq}$"), wherein $$\begin{cases} b_{pq}'' = b_p'' * b_q'' = \frac{b_p'' + b_q''}{2} \\ d_{pq}'' = d_p'' * d_q'' = \frac{d_p'' + d_q''}{2}; \\ u_{pq}'' = u_p'' * u_q'' = 0 \end{cases}$$

w" denotes an indirect trust degree between the Applet$_1$ and the Applet$_2$; b" denotes the probability of indirect trust between the Applet$_1$ and the Applet$_2$, d" denotes the probability of indirect distrust between the Applet$_1$ and the Applet$_2$, u" indicate the probability of uncertainty of whether an indirect trust exists between the Applet$_1$ and the Applet$_2$; w$_{pq}$" denotes an indirect trust degree obtained by calculating according to a sub-indirect trust degree corresponding to the p$^{th}$ indirect interaction and a sub-indirect trust degree corresponding to the q$^{th}$ indirect interaction between the Applet$_1$ and the Applet$_2$; b$_{pq}$" denotes the probability of indirect trust between the Applet$_1$ and the Applet$_2$ obtained by calculating according to a sub-indirect trust degree corresponding to the p$^{th}$ indirect interaction and a sub-indirect trust degree corresponding to the q$^{th}$ indirect interaction between the Applet$_1$ and the Applet$_2$; d$_{pq}$" denotes the probability of indirect distrust between the Applet$_1$ and the Applet$_2$ obtained by calculating according to a sub-indirect trust degree corresponding to the p$^{th}$ indirect interaction and a sub-indirect trust degree corresponding to the q$^{th}$ indirect interaction between the Applet$_1$ and the Applet$_2$; u$_{pq}$" denotes the probability of uncertainty of whether indirect trust exists between the Applet$_1$ and the Applet$_2$ obtained by calculating according to a sub-indirect trust degree corresponding to the p$^{th}$ indirect interaction and a sub-indirect trust degree corresponding to the q$^{th}$ indirect interaction between the Applet$_1$ and the Applet$_2$; and 1≤p≤M, 1≤q≤M, p≠q, and p and q are both integers.

16. The device according to claim 15, wherein the processor is configured to:
acquire a trust degree between the Applet$_1$ and the Applet$_2$ according to w=(b,d,u)=αw'+βw", wherein α+β=1, α,β∈[0,1]; and w denotes the trust degree between the Applet$_1$ and the Applet$_2$.

17. The device according to claim 10, wherein the service request message further comprises service class information.

18. The device according to claim 10, wherein the processor is also configured to:
update the direct trust degree between the Applet$_1$ and the Applet$_2$, and store the direct trust degree in a memory.

* * * * *